(12) United States Patent
Haseyama et al.

(10) Patent No.: US 8,961,668 B2
(45) Date of Patent: Feb. 24, 2015

(54) EXHAUST GAS PURIFICATION SYSTEM

(75) Inventors: Takashi Haseyama, Fujisawa (JP); Hiroyuki Oohira, Fujisawa (JP); Shinji Gotou, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 58 days.

(21) Appl. No.: 13/699,499

(22) PCT Filed: May 16, 2011

(86) PCT No.: PCT/JP2011/061215
§ 371 (c)(1), (2), (4) Date: Nov. 21, 2012

(87) PCT Pub. No.: WO2011/148812
PCT Pub. Date: Dec. 1, 2011

(65) Prior Publication Data
US 2013/0068107 A1    Mar. 21, 2013

(30) Foreign Application Priority Data
May 25, 2010  (JP) .................. 2010-119716

(51) Int. Cl.
*B01D 50/00* (2006.01)
*B01D 39/06* (2006.01)
(Continued)

(52) U.S. Cl.
CPC ............ *B01D 46/0057* (2013.01); *B01D 46/42* (2013.01); *B01D 46/44* (2013.01); *F01N 9/002* (2013.01); *B01D 2279/30* (2013.01); *F01N 2900/1606* (2013.01); *Y02T 10/47* (2013.01)
USPC ................. 96/425; 55/522; 55/523; 55/524; 422/169; 422/170; 422/171; 422/172; 422/177; 422/178; 422/179; 422/180; 422/181; 422/182

(58) Field of Classification Search
CPC .... B01D 2279/00; Y02T 10/47; Y02T 10/40; F01N 9/00
USPC ............... 55/522–524; 95/425; 422/169–172, 422/177–182
See application file for complete search history.

(56) References Cited

U.S. PATENT DOCUMENTS 7,200,991 B2 *   4/2007   Otake et al. ...................... 60/311
7,971,570 B2 *   7/2011   Noda ........................ 123/339.15
(Continued)

FOREIGN PATENT DOCUMENTS

JP    4200875    5/2005
JP    4175281    10/2005
(Continued)

OTHER PUBLICATIONS

Written Opinion of the International Searching Authority mailed Aug. 16, 2011 in corresponding International Application No. PCT/JP2011/061215.
(Continued)

*Primary Examiner* — Amber Orlando
(74) *Attorney, Agent, or Firm* — Staas & Halsey LLP

(57) ABSTRACT

An exhaust gas purification system with which a frequency of diesel particulate filter ("DPF") regeneration requests can be reduced during long low idle regeneration, thereby improving convenience, including a control unit that performs regeneration control on a DPF provided at an exhaust pipe of an engine. The control unit includes a particulate matter ("PM") accumulation amount predictor for predicting the amount of PM accumulated by calculating a cumulated value of the PM in an idling state. The control unit starts calculating the cumulated value of the PM by the PM accumulation amount predictor after a first predetermined time has elapsed since a detection of the idling state.

7 Claims, 3 Drawing Sheets

(51) Int. Cl.
    *B01D 39/14*     (2006.01)
    *B01D 39/20*     (2006.01)
    *B01D 24/00*     (2006.01)
    *B01D 49/00*     (2006.01)
    *B01D 39/00*     (2006.01)
    *B01D 41/00*     (2006.01)
    *B01D 46/00*     (2006.01)
    *B01D 45/00*     (2006.01)
    *B01D 46/42*     (2006.01)
    *B01D 46/44*     (2006.01)
    *F01N 9/00*     (2006.01)

(56) References Cited

U.S. PATENT DOCUMENTS

| | | | | |
|---|---|---|---|---|
| 8,424,290 | B2* | 4/2013 | Tan et al. | 60/285 |
| 2005/0056005 | A1* | 3/2005 | Otake et al. | 60/295 |
| 2005/0217252 | A1 | 10/2005 | Sato et al. | |
| 2006/0107649 | A1* | 5/2006 | Kamikawa et al. | 60/274 |
| 2009/0313975 | A1* | 12/2009 | McCombs | 60/290 |
| 2010/0012105 | A1* | 1/2010 | Haseyama et al. | 123/680 |
| 2010/0229538 | A1* | 9/2010 | Bloms et al. | 60/295 |
| 2012/0017573 | A1* | 1/2012 | Fujii et al. | 60/295 |

FOREIGN PATENT DOCUMENTS

| | | | |
|---|---|---|---|
| JP | 4003768 | | 8/2007 |
| JP | WO2008090695 | * | 7/2008 |
| JP | 2008-180154 | | 8/2008 |

OTHER PUBLICATIONS

Patent Abstracts of Japan, Publication No. 2008-180154, Published Aug. 7, 2008.
European Patent Application, Publication No. EP 1790837 A1, Published May 30, 2007.
Patent Abstracts of Japan, Publication No. 2005-127207, Published May 19, 2005.
International Search Report of PCT/JP2011/061215 mailed Aug. 16, 2011.

* cited by examiner

EXHAUST GAS PURIFICATION SYSTEM

This application claims the foreign priority benefit of Japanese Application No. 2010-119716 filed May 25, 2010, the contents of which are incorporated herein by reference, which serves as priority for PCT Application No. JP2011/061215 filed May 16, 2011.

TECHNICAL FIELD

The present invention relates to an exhaust gas purification system that reduces the amount of PM (Particulate Matter) exhausted to the outside by trapping the PM contained in exhaust gas from a diesel engine by a DPF (Diesel Particulate Filter).

BACKGROUND ART

A DPF device of a continuous regeneration type has been known as the exhaust gas purification system for reducing the amount of the PM exhausted to the outside by trapping the PM exhausted from the diesel engine by means of a filter called the DPF, the DPF device including the DPF and a DOC (Diesel Oxidation Catalyst) provided on the upstream side of the DPF (refer to Patent Document 1, for example).

In this DPF device of a continuous regeneration type, the PM trapped in the DPF is continuously combusted and purified so that the DPF self-regenerates, when the temperature of the exhaust gas is approximately 350° C. or higher. When the temperature of the exhaust gas is low, however, it is difficult for the PM to be oxidized and for the DPF to self-regenerate since the DOC would have a lowered temperature and not be activated. As a result, the PM would be accumulated in the DPF which would be clogged up in a progressive manner, causing the problem that the exhaust pressure would be increased.

Now, when the amount of the PM accumulated in the DPF has exceeded a predetermined amount, the exhaust gas purification system regenerates the DPF by performing multi-stage retarded injection (multi-injection) or post-injection of a fuel into a cylinder to forcibly raise the temperature of the exhaust gas flowing into the DPF, thereby combusting and removing the PM trapped in the DPF.

The multi-injection is performed in order to raise the temperature of the DOC to a catalyst activation temperature by raising the temperature of the exhaust gas exhausted from the engine. The post-injection is performed in order to raise the temperature of the exhaust gas at the inlet of the DPF to the temperature equal to or higher than the temperature at which the PM is combusted, by supplying a large amount of unburned fuel into the exhaust gas and oxidizing (combusting) the supplied unburned fuel by the DOC.

The DPF regeneration includes automatic regeneration and manual regeneration. The automatic regeneration refers to the DPF regeneration that is performed automatically while a vehicle is in motion, and the manual regeneration refers to the DPF regeneration that is performed by the manual operation of a driver while the vehicle is stopped. In the manual regeneration, the driver is alerted when clogging in the DPF (the amount of the PM accumulated) has exceeded the predetermined amount while the vehicle is stopped, so that the DPF is regenerated when the driver presses a regeneration button.

Moreover, LLIR (Long Low Idle Regeneration) is one of the DPF regenerations performed when the vehicle has idled for a predetermined time or longer (refer to Patent Document 2, for example).

PRIOR ART DOCUMENTS
Patent Document 1: Japanese Patent No. 4175281
Patent Document 2: Japanese Patent Application Publication No. 2008-180154

Now, in the LLIR, it is difficult to calculate the amount of the PM accumulated by a distance traveled or differential pressure in the DPF since the vehicle is stopped and idling. Accordingly, the DPF is automatically regenerated upon issuing a regeneration request to the driver when a cumulated value has reached a predetermined value or higher, the cumulated value being obtained by cumulating stopped/idling time or cumulating predicted amounts of the PM accumulated that vary depending on the speed and the load of the engine.

However, in the regeneration of the DPF during the aforementioned LLIR, the stopped/idling time would be counted and cumulated even when the vehicle is temporarily stopped at the traffic light or the like or repeats stopping and moving. As a result, there arises a problem of inconvenience that the regeneration request is issued when the cumulated value has exceeded a predetermined threshold and that the frequency of the regeneration request issued is increased.

The present invention has been designed to solve the aforementioned problems, and an object thereof is to provide an exhaust gas purification system that can reduce the frequency of the DPF regeneration requests issued during the LLIR, thereby improving convenience.

SUMMARY OF THE INVENTION

To achieve the object described above, an exhaust gas purification system according to the present invention includes a control unit for performing regeneration control on a diesel particulate filter that is provided to an exhaust pipe of an engine, wherein the control unit includes PM accumulation amount predicting part for predicting an amount of PM accumulated by calculating a cumulated value of the PM in an idling state and starts calculating the cumulated value of the PM by using the PM accumulation amount predicting part after a first predetermined time has elapsed since the detection of the idling state.

The first predetermined time is preferably set equal to or longer than a time for which a vehicle waits at a traffic light.

The exhaust gas purification system preferably measures a time starting from when the cumulated value of the PM predicted by the PM accumulation amount predicting part has reached a predetermined value or greater, and starts performing the regeneration control on the diesel particulate filter when the measured time has passed a second predetermined time.

The second predetermined time is preferably set equal to or longer than the time for which the vehicle waits at a traffic light.

According to the present invention, the frequency of the DPF regeneration requests issued during the LLIR can be reduced to improve convenience.

Embodiments of the present invention will be described below with reference to the drawings.

Figure 1:
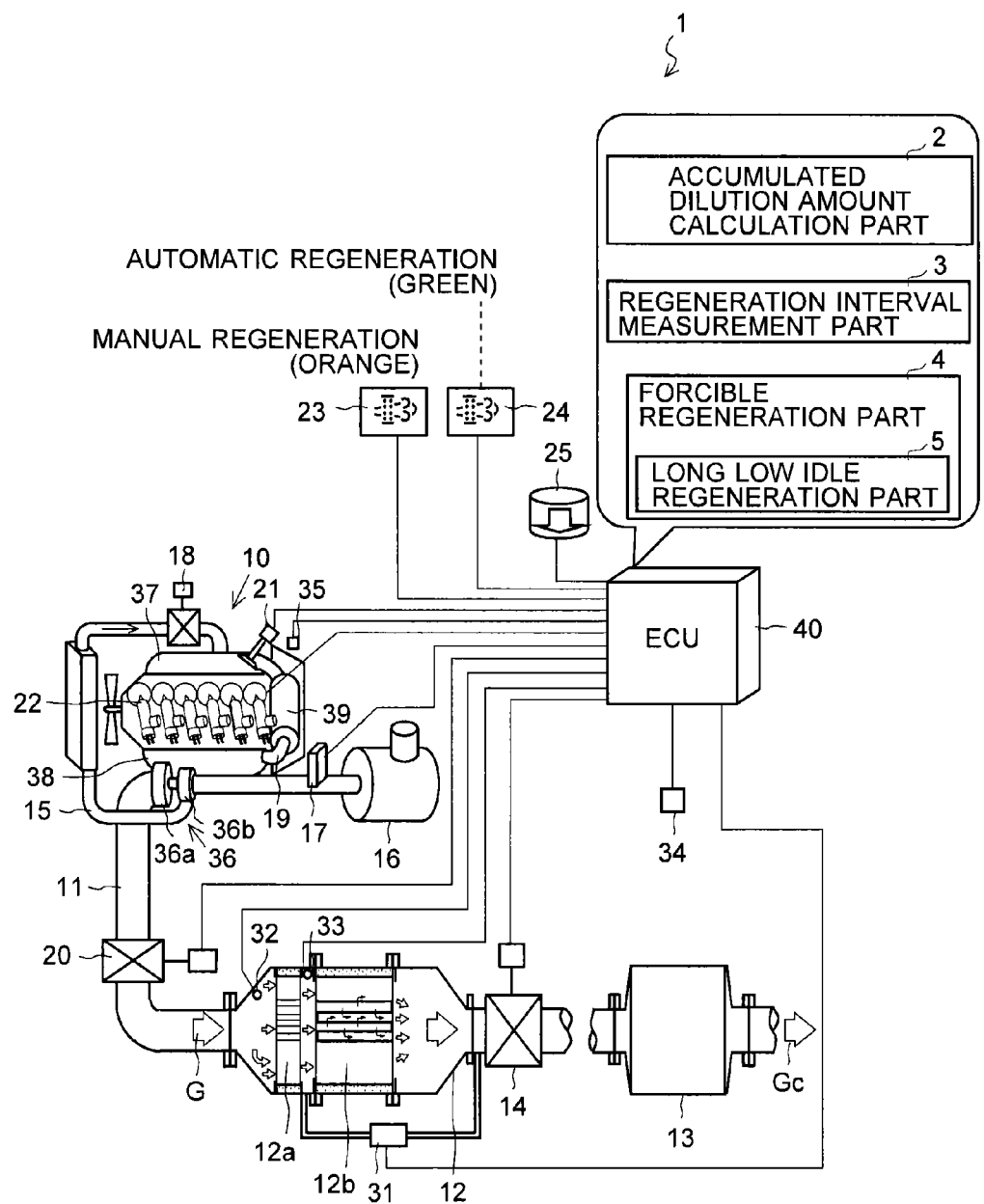
FIG. 1 is a diagram illustrating an overall structure of an exhaust gas purification system according to an embodiment of the present invention.

FIG. 1 illustrates a structure of an exhaust gas purification system 1 according to the present embodiment. In this exhaust gas purification system 1, an exhaust pipe 11 of a diesel engine (an internal combustion engine) 10 is provided with a continuous regeneration type DPF (also referred to as a DPD: Diesel Particulate Defuse') device 12 that is an exhaust gas purification device. This continuous regeneration type DPF device 12 includes a DPF 12b for trapping PM contained in the exhaust gas and a DOC 12a provided on the upstream side of the DPF 12b. The DPF 12b is formed of a CSF (Catalyzed Soot Filter). A silencer (muffler) 13 is disposed in the exhaust pipe 11 downstream of the continuous regeneration type DPF device 12. An exhaust gas G is purified by the continuous regeneration type DPF device 12 and released into the atmosphere as a purified exhaust gas Gc via the silencer 13.

The DOC 12a includes an oxidation catalyst such as platinum that is carried on a carrier of porous ceramic honeycomb structure or the like. The DPF 12b includes a monolith honeycomb wall flow-type filter or the like where inlets and outlets of porous ceramic honeycomb channels are plugged alternately. A catalyst of platinum, cerium oxide or the like is carried on this filter portion. The PM contained in the exhaust gas G is trapped on the porous ceramic wall.

In addition, in order to estimate the amount of the PM accumulated on the DPF 12b, a differential pressure sensor 31 for detecting the differential pressure between the front and the back of the DPF 12b is provided in a conduit connected to the front and the back of the DPF 12b. Moreover, an exhaust throttle valve 14 is provided to the exhaust pipe 11 on the downstream side of the continuous regeneration type DPF device 12, and an exhaust brake 20 is provided to the exhaust pipe 11 on the upstream side of the continuous regeneration type DPF device 12.

A DOC inlet exhaust temperature sensor 32 for detecting the temperature of the exhaust gas flowing into the DOC 12a is provided on the upstream side of the DOC 12a in the continuous regeneration type DPF device 12. A DPF inlet exhaust temperature sensor 33 for detecting the temperature of the exhaust gas flowing into the DPF 12b is provided between the DOC 12a and the DPF 12b.

Provided in an air-intake passage 15 of the engine 10 are, from an intake port to the engine 10 side, an air cleaner 16, an MAF sensor (an intake air volume sensor) 17, a compressor 36b for a turbocharger 36, and an intake throttle valve (intake throttle) 18. The intake throttle valve 18 regulates the intake air volume supplied to an intake manifold 37. The exhaust gas exhausted from an exhaust manifold 38 flows into the continuous regeneration type DPF device 12 by passing through a turbine 36a of the turbocharger 36 and the exhaust brake 20.

Furthermore, the intake manifold 37 and the exhaust manifold 38 are connected to an EGR (Exhaust Gas Recirculation) passage 19 for feeding a portion of the exhaust gas exhausted from the engine 10 back to the intake manifold 37. The EGR passage 19 is provided with an EGR cooler 39 for cooling the exhaust gas to be fed back to the intake manifold 37 and an EGR valve 21 for regulating the amount of EGR, that is the amount of the exhaust gas to be fed back to the intake manifold 37.

A signal from the MAF sensor 17, the DOC inlet exhaust temperature sensor 32, the DPF inlet exhaust temperature sensor 33, a vehicle speed sensor 34, and an engine speed sensor 35 is input into an ECU (Electronic Control Unit) 40 that performs general control on the engine 10 as well as regeneration control on the DPF. The exhaust throttle valve 14, the exhaust brake 20, the intake throttle valve 18, the EGR valve 21, a fuel injection device 22 and the like are controlled by a control signal from the ECU 40.

The exhaust gas purification system 1 includes an accumulated dilution amount calculation part 2, a regeneration interval measurement part 3, and a forcible regeneration part 4 that are installed in the ECU 40.

The accumulated dilution amount calculation part 2 calculates the accumulated dilution amount by cumulating the dilution amount that increases as the DPF is regenerated and subtracting the dilution amount that decreases as the vehicle travels.

The regeneration interval measurement part 3 measures a regeneration interval between the completion of the DPF regeneration and the start of the following DPF regeneration.

The forcible regeneration part 4 is adapted to automatically regenerate the DPF while the vehicle is in motion as long as a certain condition (hereinafter referred to as an automatic regeneration condition) is satisfied, the condition being that, when the amount of the PM accumulated in the DPF 12b has exceeded a predetermined amount, the accumulated dilution amount is less than a predetermined threshold and the regeneration interval is equal to or greater than a predetermined threshold. The forcible regeneration part 4 turns on an automatic regeneration lamp (green) 24 while the automatic regeneration is being performed.

In addition, when the amount of the PM accumulated in the DPF 12b has exceeded the predetermined amount but the automatic regeneration condition has not been satisfied, the forcible regeneration part 4 prompts the driver to manually regenerate the DPF while the vehicle is stopped so that the manual regeneration is performed by the operation of the driver while the vehicle is stopped. When the amount of the PM accumulated in the DPF 12b has exceeded the predetermined amount but the automatic regeneration condition has not been satisfied, the forcible regeneration part 4 prompts the driver to perform the manual regeneration by blinking a manual regeneration lamp (orange) 23. Moreover, the forcible regeneration part 4 turns on the manual regeneration lamp (orange) 23 during the manual regeneration. Furthermore, the forcible regeneration part 4 is adapted to perform the manual regeneration when the driver presses a manual regeneration button (a DPF manual regeneration execution switch) 25 while the vehicle is stopped.

Here, the amount of the PM accumulated is detected on the basis of the differential pressure detected by the differential pressure sensor 31 between the front and the back of the DPF 12b, or the distance traveled calculated on the basis of the vehicle speed that is detected by the vehicle speed sensor 34. In short, the forcible regeneration part 4 determines that the amount of the PM accumulated in the DPF 12b has exceeded the predetermined amount when the differential pressure between the front and the back of the DPF 12b has exceeded the predetermined threshold or when the distance traveled has exceeded the predetermined threshold.

In the DPF regeneration, the DPF 12b is forcibly regenerated by implementing PM combustion/removal control in which: the multi-injection of the fuel is performed to raise the temperature of the exhaust gas exhausted from the engine 10 when the temperature of the exhaust gas detected by the DOC inlet exhaust temperature sensor 32 or the DPF inlet exhaust temperature sensor 33 is lower than a first determination value (the activation temperature of the DOC such as 250° C.); and the post-injection is performed when the temperature of the exhaust gas detected by the DOC inlet exhaust temperature sensor 32 or the DPF inlet exhaust temperature sensor 33 has reached the first determination value or higher. The multi-injection and the post-injection are combined as needed in the PM combustion/removal control. In the manual regeneration, the exhaust brake 20 would not be applied until the temperature of the exhaust gas reaches the first determination value or higher in order to rapidly raise the temperature of the exhaust gas. Moreover, in the manual regeneration, the exhaust throttle valve 14 would be closed during the PM combustion/removal control in order to throttle the exhaust gas and raise the temperature thereof.

Now, the forcible regeneration part 4 in the exhaust gas purification system 1 according to the present embodiment includes a long low idle regeneration part 5 that performs LLIR (long low idle regeneration). In the LLIR, PM accumulation amount predicting part starts calculating the cumulated value of the PM after the stopped/ idling time, which is the time during which the vehicle is stopped and idling, has passed a first predetermined time tw. The long low idle regeneration part 5 measures a time starting from when the cumulated value of the PM predicted by the PM accumulation amount predicting means has reached a predetermined value or higher, and starts the regeneration control on the DPF to perform the manual regeneration automatically when the measured time has passed a second predetermined time tx. Furthermore, the long low idle regeneration part 5 determines that the vehicle is stopped and idling when the vehicle speed is equal to or less than the predetermined threshold (or the vehicle speed=0) and the engine speed is within a predetermined range (near the engine speed at idle).

The long low idle regeneration part 5 regenerates the DPF not at a time point when the cumulated value of the stopped/idling time has exceeded the predetermined threshold but at a time point when the predetermined time has passed since the aforementioned time point. This is to inhibit the DPF regeneration from being started while the vehicle is stopped for a short period of time at the traffic light or the like. Note that the wait time counted from the time point when the cumulated value of the stopped/idling time has exceeded the predetermined threshold would be reset every time the vehicle resumes moving and counted from 0 every time the vehicle is stopped.

Figure 3:
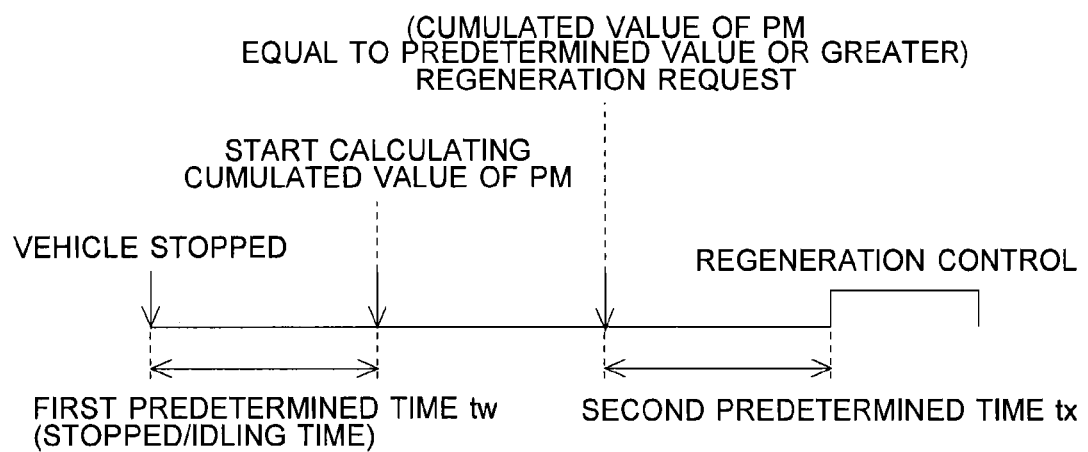
FIG. 3 is a diagram for chronologically describing a flow from when a vehicle is stopped to when regeneration control is performed on a DPF.

As illustrated in FIG. 3, the PM accumulation amount predicting means starts calculating the cumulated value of the PM after the first predetermined time (stopped/ idling time) tw has elapsed since the vehicle was detected to be stopped and idling. This is to only consider the state in which the vehicle is stopped for a long period of time and not cumulate the time during which the vehicle is stopped for a short period of time waiting at the traffic light or the like. The aforementioned stopped/ idling time tw is preferably equal to or longer than the time for which the vehicle waits at the traffic light. The vehicle is considered to be stopped and idling when all of the following conditions are satisfied: the vehicle speed is equal to or less than the predetermined value; a neutral switch is on; an accelerator pedal is off; the engine is running; the regeneration is not in place; and there are no other errors.

The regeneration request is issued when the cumulated value of the PM has reached the predetermined value or higher after the calculation of the cumulated value of the PM has been started, and the regeneration control starts after the second predetermined time tx has elapsed since the issuing of the regeneration request. This is to avoid the forcible regeneration being started while the vehicle is stopped at the traffic light and to improve convenience. In short, the second predetermined time tx is preferably equal to or longer than the time for which the vehicle waits at the traffic light.

In the present embodiment, the long low idle regeneration part 5 is configured to continue regenerating the DPF by shifting from the LLIR to the automatic regeneration when the vehicle starts moving during the LLIR.

Specifically, when the vehicle starts moving during the LLIR, the long low idle regeneration part 5 stops the LLIR for the moment and shifts from the LLIR to the automatic regeneration by starting the automatic regeneration when the vehicle has traveled at the speed equal to or faster than the predetermined threshold for the predetermined period of time or longer.

In addition, the long low idle regeneration part 5 is adapted to shift from the LLIR to the automatic regeneration only when the automatic regeneration condition (the condition in which the accumulated dilution amount is less than the predetermined threshold and the regeneration interval is equal to or greater than the predetermined threshold) has been satisfied. This is because there is a possibility that the dilution amount would be increased due to the automatic regeneration when the automatic regeneration is performed with the automatic regeneration condition not being satisfied, thereby causing failure.

Moreover, with the automatic regeneration condition not being satisfied, the long low idle regeneration part 5 blinks the manual regeneration lamp (orange) 23 when the cumulated value of the stopped/idling time has exceeded the predetermined threshold and turns on the manual regeneration lamp (orange) 23 during the LLIR. This is to prompt the driver not to drive the vehicle since the DPF would stop regenerating (it would not be shifted to the automatic regeneration) when the vehicle moves with the automatic regeneration condition not being satisfied. Moreover, the long low idle regeneration part 5 blinks the manual regeneration lamp (orange) 23 when the cumulated value of the stopped/idling time has exceeded the predetermined threshold, since the automatic regeneration cannot be performed with the automatic regeneration condition not being satisfied and the manual regeneration needs to be performed.

Furthermore, with the automatic regeneration condition being satisfied, the long low idle regeneration part 5 does not turn on or blink any lamps when the cumulated value of the stopped/idling time has exceeded the predetermined threshold and only turns on the automatic regeneration lamp (green) 24 during the LLIR. This is to notify the driver that he/she may drive the vehicle because, with the automatic regeneration condition being satisfied, the DPF regeneration is shifted to the automatic regeneration and continued even when the vehicle resumes moving.

Furthermore, with the automatic regeneration condition being satisfied, the long low idle regeneration part 5 shifts to a normal manual regeneration and continues regenerating the DPF when the manual regeneration button 25 is pressed during the LLIR (while the automatic regeneration lamp (green) is turned on). When the manual regeneration button 25 is pressed, the long low idle regeneration part 5 turns off the automatic regeneration lamp (green) 24 and turns on the manual regeneration lamp (orange) 23. Note that in the normal manual regeneration, the DPF regeneration would be stopped without shifting to the automatic regeneration when the vehicle resumes moving.

Now, the control flow performed by the long low idle regeneration part 5 of the control unit 40 will be described with reference to FIG. 2. The long low idle regeneration part 5 is adapted to perform the control flow illustrated in FIG. 2 when the vehicle is stopped.

Figure 2:
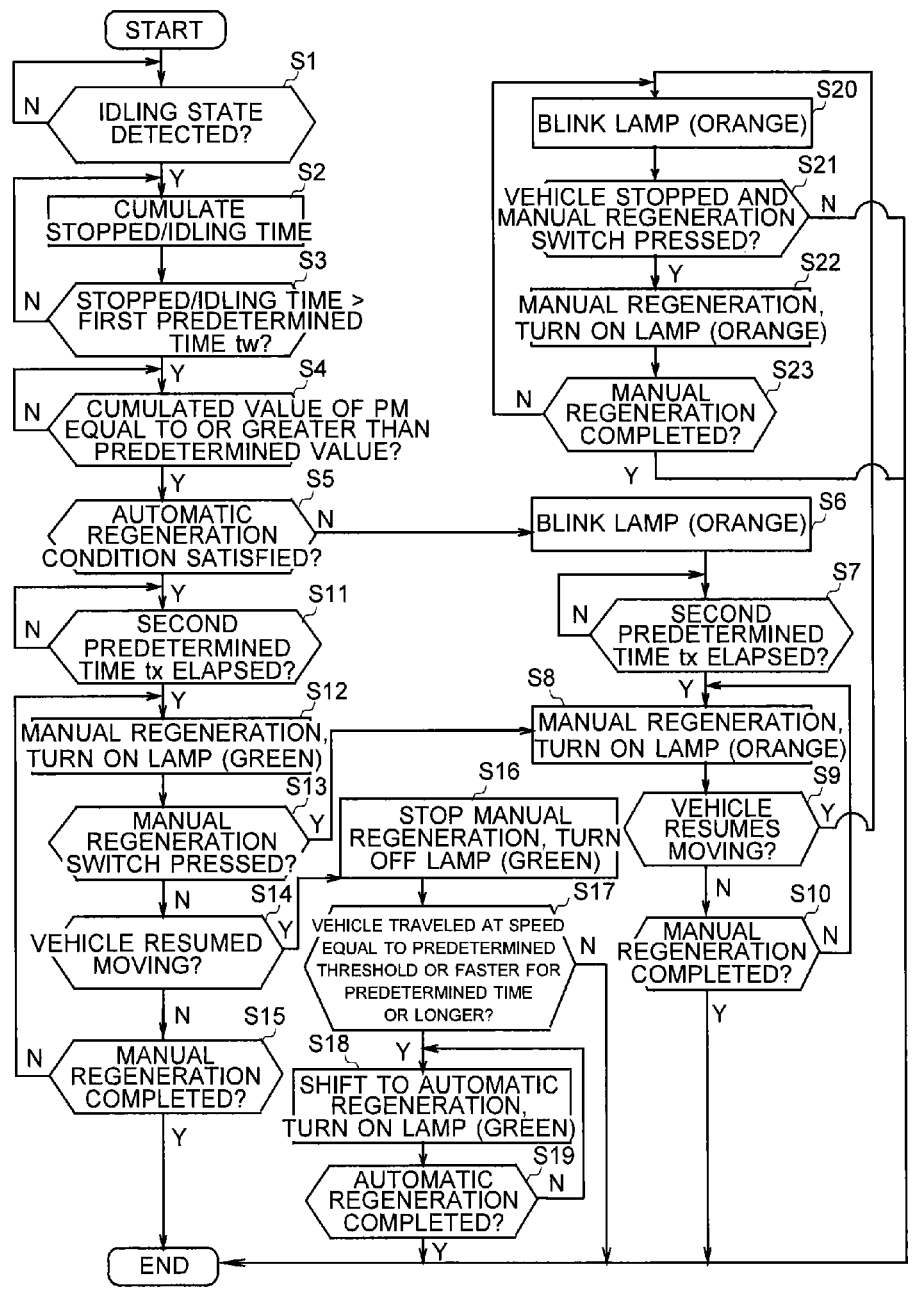
FIG. 2 is a flowchart illustrating a control flow of a control unit.

As illustrated in FIG. 2, the long low idle regeneration part 5 detects whether or not the vehicle is idling in step S1 and, when the vehicle is determined to be idling, starts cumulating the stopped/idling time (step S2) and proceeds to step S3. In step S3, the long low idle regeneration part 5 determines whether the cumulated value of the stopped/idling time has exceeded the first predetermined time tw that is the predetermined threshold and, when the determination is NO, returns to step S2 and continues cumulating the stopped/idling time. Although not shown in FIG. 2, the long low idle regeneration part 5 stores the cumulated value of the stopped/idling time and terminates the control when the vehicle resumes moving while the stopped/idling time is being cumulated. The next time the stopped/idling time is cumulated, the long low idle regeneration part 5 starts cumulating from the cumulated value of the stopped/idling time stored.

When it is determined YES in step S3, the long low idle regeneration part 5 determines in step S4 whether the cumulated value of the PM is equal to or greater than the predetermined value. When it is determined NO, the long low idle regeneration part 5 returns to step S4 and, when it is determined YES, proceeds to step S5. In step S5, the long low idle regeneration part 5 determines whether the automatic regeneration condition (the condition that the accumulated dilution amount is less than the predetermined threshold and the regeneration interval is equal to or greater than the predetermined threshold) is satisfied.

When it is determined NO in step S5, the manual regeneration needs to be performed since the cumulated value of the stopped/idling time has exceeded the predetermined threshold, which requires the DPF to be regenerated, and the automatic regeneration condition has not been satisfied. Accordingly, in step S6, the long low idle regeneration part 5 blinks the manual regeneration lamp (orange) 23 and performs the manual regeneration (LLIR) automatically in step S8 after waiting for the second predetermined time tx in step S7. At this time, the long low idle regeneration part 5 turns on the manual regeneration lamp (orange) 23 to prompt the driver not to drive the vehicle.

Thereafter, in step S9, the long low idle regeneration part 5 determines whether the vehicle has resumed moving. When it is determined YES in step S9, the long low idle regeneration part 5 blinks the manual regeneration lamp (orange) 23 in step S20 and proceeds to step 21. In step 21, the long low idle regeneration part 5 determines whether the vehicle has been stopped and the manual regeneration switch has been pressed and, when it is determined NO, completes the control. When it is determined YES in step S21, the long low idle regeneration part 5 proceeds to step S22 to start the manual regeneration and turn on the manual regeneration lamp (orange) 23, and proceeds to step S23. In step S23, the long low idle regeneration part 5 determines whether the manual regeneration has been completed and, when it is determined NO, returns to step S20. When it is determined YES in step S23, the long low idle regeneration part 5 completes the control.

When it is determined YES in step S5, on the other hand, the long low idle regeneration part 5 waits for the second predetermined time tx in step S11 and performs the manual regeneration (LLIR) automatically in step S12. At this time, the long low idle regeneration part 5 turns on the automatic regeneration lamp (green) 24.

Thereafter, in step S13, the long low idle regeneration part 5 determines whether the manual regeneration button 25 has been pressed. When it is determined YES in step S13, the long low idle regeneration part 5 proceeds to step S8 and shifts to the normal manual regeneration. At this time, the long low idle regeneration part 5 turns off the automatic regeneration lamp (green) 24 and turns on the manual regeneration lamp (orange) 23.

When it is determined NO in step S13, the long low idle regeneration part 5 determines in step S14 whether the vehicle has resumed moving. When it is determined NO in step S14, the long low idle regeneration part 5 determines in step S15 whether the manual regeneration has been completed. When it is determined NO in step S15, the long low idle regeneration part 5 returns to step S12 to continue the manual regeneration and, when it is determined YES in step S15, completes the control.

When it is determined YES in step S14, the long low idle regeneration part 5 stops the manual regeneration and turns off the automatic regeneration lamp (green) 24 in step S16. After having stopped the manual regeneration, the long low idle regeneration part 5 proceeds to step S17.

In step S17, the long low idle regeneration part 5 determines whether the vehicle has traveled at the speed equal to or faster than the predetermined threshold for the predetermined period of time or longer. When it is determined NO in step S17, the long low idle regeneration part 5 completes the control.

When it is determined YES in step S17, the long low idle regeneration part 5 starts the automatic regeneration and turns on the automatic regeneration lamp (green) 24 in step S18. Thereafter, the long low idle regeneration part 5 determines whether the automatic regeneration has been completed in step S19. When it is determined NO in step S19, the long low idle regeneration part 5 returns to step S18 to continue the automatic regeneration and, when it is determined YES in step S19, completes the control.

As described above, in the exhaust gas purification system 1 according to the present embodiment that includes the control unit 40 for performing regeneration control on the diesel particulate filter (DPF 12b) provided to the exhaust pipe 11 of the engine 10, the control unit 40 includes the PM accumulation amount predicting part for predicting the amount of the PM accumulated by calculating the cumulated value of the PM when the vehicle is idling. The PM accumulation amount predicting part starts calculating the cumulated value of the PM after the predetermined time has elapsed since the detection of the idling state, thereby no longer cumulating the time for which the vehicle is stopped for a short period of time at the traffic light or the like, reducing the frequency of the regeneration request issued during the regeneration control on the DPF in the LLIR, and improving user convenience.

In addition, the control unit 40 (the long low idle regeneration part 5, specifically) is configured to continue regenerating the DPF by shifting fro the LLIR to the automatic regeneration when the vehicle resumes moving during the LLIR. As a result, the DPF regeneration can be continued even when the vehicle needs to be moved during the LLIR, thereby suppressing clogging in the DPF. Moreover, the DPF regeneration can be continued even when the vehicle resumes moving during the LLIR, thereby eliminating the need to wait until the manual regeneration by the LLIR is completed and improving convenience. The present invention is particularly effective for a vehicle (such as a fire truck) that performs the LLIR relatively frequently, travels a short distance, and idles frequently.

Moreover, the exhaust gas purification system 1 is configured to shift from the LLIR to the automatic regeneration by stopping the LLIR once the vehicle has resumed moving during the LLIR and starting the automatic regeneration when the vehicle has traveled at the speed equal to or faster than the predetermined threshold for the predetermined period of time or longer. Therefore, when the vehicle moves a short distance for a short period of time in, for example, a construction site, the DPF regeneration can be stopped in the manner similar to that of the normal manual regeneration to prevent the vehicle from shifting to the automatic regeneration. This is because the DPF regeneration would not be completed while the vehicle is stopped in the automatic regeneration, and because the regeneration needs to be switched to the manual regeneration by pressing the manual regeneration button 25 when the vehicle is to be stopped during the automatic regeneration. That is, it is cumbersome for the driver who has to perform more operations when the regeneration shifts to the automatic regeneration due to the vehicle traveling a short distance for a short period of time.

Moreover, in the exhaust gas purification system 1, the long low idle regeneration part 5 is configured to shift from the LLIR to the automatic regeneration only when the automatic regeneration condition (the condition that the accumulated dilution amount is less than the predetermined threshold and the regeneration interval is equal to or greater than the predetermined threshold) is satisfied. This can prevent failure from occurring due to the increase in the dilution amount.

Furthermore, with the automatic regeneration condition not being satisfied, the exhaust gas purification system 1 is configured such that the long low idle regeneration part 5 blinks the manual regeneration lamp 23 when the cumulated value of the stopped/idling time has exceeded the predetermined threshold and turns on the manual regeneration lamp 23 during the LLIR. With the automatic regeneration condition being satisfied, the exhaust gas purification system 1 is configured such that the long low idle regeneration part 5 turns on the automatic regeneration lamp 24 only during the LLIR.

The conventional exhaust gas purification system has prompted the driver not to drive the vehicle by blinking the manual regeneration lamp 23 when the cumulated value of the stopped/ idling time has exceeded the predetermined threshold, and by turning on the manual regeneration lamp 23 while the LLIR is being performed. However, in the conventional exhaust gas purification system, improvement has been desired in terms of convenience due to the problem that for the vehicle (such as the fire truck) that travels a short distance and idles frequently, the manual regeneration lamp 23 blinks frequently, causing the driver to respond to the blinking of the manual regeneration lamp 23 and press the manual regeneration button 25, or causing the manual regeneration to start by the LLIR, thereby preventing the vehicle from moving until the manual regeneration is completed.

On the other hand, the exhaust gas purification system 1 according to the present embodiment blinks and turns on the manual regeneration lamp 23 only when the automatic regeneration condition is not satisfied and the manual regeneration is required. When the automatic regeneration condition is satisfied, the exhaust gas purification system 1 turns on the automatic regeneration lamp 24 since the vehicle can shift to the automatic regeneration even when in motion. Consequently, the exhaust gas purification system 1 can inhibit the manual regeneration lamp 23 from blinking frequently even when the vehicle travels a short distance and idles frequently, thereby improving convenience.

The embodiments according to the present invention have been described in detail with reference to the drawings. However, the present invention is not limited to the aforementioned embodiments and may adopt various design changes within the scope that does not depart from the spirit of the present invention. For example, the exhaust gas purification device of the exhaust gas purification system has been described by the combination of the DOC 12*a* on the upstream side and the DPF 12*b* on the downstream side as an example. However, the exhaust gas purification device may also be a filter carrying an oxidation catalyst. In addition, the method of supplying the unburned fuel (HC) to the upstream side of the DOC 12*a* has been described by the post-injection. However, a method of directly injecting the unburned fuel into the exhaust pipe may also be adopted in which an unburned fuel supply device is disposed in the exhaust pipe 11 to directly inject the unburned fuel into the exhaust pipe 11.

The invention claimed is:

1. An exhaust gas purification system, comprising:
a control device configured to perform regeneration control on a diesel particulate filter that is provided to an exhaust pipe of a vehicle engine,
wherein the control device includes a part for detecting an idling state of the engine, a part for predicting an amount of particulate matter accumulated at the diesel particulate filter by calculating a cumulated value of the particulate matter for the detected engine idling state, and a long low idle regeneration part,
wherein, only after the detection of the engine idling state by the part for detecting the idling state, and then after a first predetermined time has elapsed, the control device starts calculating the cumulated value of the particulate matter by the particulate matter accumulation amount predicting part, and starts performing the regeneration control via the long low idle regeneration part, when the predicted cumulated value of the particulate matter has reached a predetermined value or greater.

2. The exhaust gas purification system according to claim 1, wherein the first predetermined time is set equal to or longer than a second predetermined time.

3. The exhaust gas purification system according to claim 1 wherein the control device measures a time starting from when the predicted cumulated value of the particulate matter has reached the predetermined value or greater, and starts performing the regeneration control when the measured time has passed a second predetermined time.

4. The exhaust gas purification system according to claim 2 wherein the control device measures a time starting from when the predicted cumulated value of the particulate matter has reached the predetermined value or greater, and starts performing the regeneration control when the measured time has passed a second predetermined time.

5. The exhaust gas purification system according to claim 3, wherein the second predetermined time is set equal to or longer than a third predetermined time.

6. The exhaust gas purification system according to claim 4, wherein the second predetermined time is set equal to or longer than the third predetermined time.

7. An exhaust gas purification method for performing regeneration control on a diesel particulate filter that is provided to an exhaust pipe of a vehicle engine, comprising:
detecting an idling state of the engine,
only after the detection of the engine idling stated and then after a first predetermined time has elapsed, predicting an amount of particulate matter accumulated at the diesel particulate filter by calculating a cumulated value of the particulate matter for the detected engine idling state, and
starting performance of the regeneration control when the predicted cumulated value of the particulate matter has reached a predetermined value or greater.

* * * * *